US011100132B2

(12) United States Patent
Ward et al.

(10) Patent No.: US 11,100,132 B2
(45) Date of Patent: Aug. 24, 2021

(54) INTELLIGENT SPACE RELEASE IN ASYNCHRONOUS MIRROR JOURNAL VOLUMES

(71) Applicant: International Business Machines Corporation, Armonk, NY (US)

(72) Inventors: Matthew J. Ward, Vail, AZ (US); Joshua J. Crawford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 16/157,795

(22) Filed: Oct. 11, 2018

(65) Prior Publication Data

US 2020/0117749 A1    Apr. 16, 2020

(51) Int. Cl.
| | |
|---|---|
| *G06F 16/00* | (2019.01) |
| *G06F 16/27* | (2019.01) |
| *G06F 16/215* | (2019.01) |
| *G06F 16/22* | (2019.01) |
| *G06F 16/23* | (2019.01) |

(52) U.S. Cl.
CPC ......... *G06F 16/273* (2019.01); *G06F 16/215* (2019.01); *G06F 16/2237* (2019.01); *G06F 16/2365* (2019.01)

(58) Field of Classification Search
CPC .. G06F 16/273; G06F 16/215; G06F 16/2237; G06F 16/2365
USPC .......................................................... 707/613
See application file for complete search history.

(56) References Cited

U.S. PATENT DOCUMENTS

| | | | | |
|---|---|---|---|---|
| 5,875,481 | A  * | 2/1999  | Ashton ................. | G06F 3/0613 711/165 |
| 6,574,717 | B1 * | 6/2003  | Ngai ................... | G06F 16/2365 711/147 |
| 7,464,239 | B2 * | 12/2008 | Hwang ............... | G06F 11/2058 709/203 |
| 8,086,652 | B1   | 12/2011 | Bisson et al. | |
| 9,946,485 | B1   | 4/2018  | Don et al. | |
| 9,952,767 | B2   | 4/2018  | Zheng et al. | |
| 10,719,446 | B2 * | 7/2020  | Loaiza ................ | G06F 12/0866 |

(Continued)

OTHER PUBLICATIONS

"Method to Release Space on a Full Duplex PPRC Secondary," IP.com, IPCOM000254414D, Jun. 26, 2018.

*Primary Examiner* — Thanh-Ha Dang
(74) *Attorney, Agent, or Firm* — Nelson IP; Daniel P. Nelson

(57) ABSTRACT

A method for more intelligently managing storage space in journal volumes is disclosed herein. In one embodiment, such a method includes maintaining, on a primary storage system, a change recording data structure that documents updated storage elements of a primary volume on the primary storage system. The method further determines in which extents of the primary volume the updated storage elements reside. These extents are recorded in an extent-based data structure. The method transmits the extent-based data structure from the primary storage system to a secondary storage system that is in an asynchronous mirroring relationship with the primary storage system. The extent-based data structure is then read at the secondary storage system. The method frees, from a journal volume on the secondary storage system, extents that are not recorded in the extent-based data structure. A corresponding system and computer program product are also disclosed herein.

20 Claims, 5 Drawing Sheets

(56) References Cited

U.S. PATENT DOCUMENTS

| | | | |
|---|---|---|---|
| 2005/0251633 A1* | 11/2005 | Micka | G06F 11/2076 |
| | | | 711/162 |
| 2006/0031647 A1* | 2/2006 | Hirakawa | G06F 11/2082 |
| | | | 711/162 |
| 2008/0034176 A1* | 2/2008 | Akutsu | G06F 11/2058 |
| | | | 711/162 |
| 2008/0133828 A1* | 6/2008 | Saito | G06F 11/1451 |
| | | | 711/111 |
| 2009/0013012 A1* | 1/2009 | Ichikawa | G06F 11/1464 |
| 2009/0043968 A1* | 2/2009 | Vanamamalai | G06F 16/128 |
| | | | 711/147 |
| 2010/0199042 A1* | 8/2010 | Bates | H04L 9/0891 |
| | | | 711/114 |
| 2011/0286123 A1* | 11/2011 | Montgomery | G06F 3/061 |
| | | | 360/15 |
| 2016/0266806 A1* | 9/2016 | Crawford | G06F 3/0683 |
| 2016/0378338 A1* | 12/2016 | Khandelwal | G06F 3/0689 |
| | | | 711/154 |
| 2016/0378378 A1* | 12/2016 | Coronado | G06F 3/0665 |
| | | | 711/162 |
| 2017/0031994 A1 | 2/2017 | Patterson, III et al. | |
| 2017/0206020 A1* | 7/2017 | Brown | G06F 3/067 |
| 2017/0206158 A1* | 7/2017 | Brown | G06F 12/023 |
| 2017/0300243 A1 | 10/2017 | Diel et al. | |
| 2019/0227990 A1* | 7/2019 | Kumarasamy | G06F 16/252 |

* cited by examiner

INTELLIGENT SPACE RELEASE IN ASYNCHRONOUS MIRROR JOURNAL VOLUMES

BACKGROUND

Field of the Invention

This invention relates to systems and methods for intelligently releasing storage space in journal volumes of asynchronous data replication environments.

Background of the Invention

In asynchronous data replication environments such as z/OS Global Mirror (also referred to as "XRC") and Global Mirror, data is asynchronously mirrored from a primary storage system to a secondary storage system to maintain two consistent copies of the data. The primary and secondary storage systems may be located at different sites, perhaps hundreds or even thousands of miles away from one another. In the event an outage occurs at the primary site, host I/O may be redirected to the secondary storage system, thereby enabling continuous operations. When the outage is corrected or repaired at the primary site, host I/O may be redirected back to the primary storage system.

Global Mirror is a newer technology than XRC and differs in some important ways from XRC. For example, Global Mirror runs entirely within an enterprise storage system, such as the IBM DS8000™ enterprise storage system, and uses Global Copy®, FlashCopy®, and a data freeze technique to maintain data consistency. XRC uses a host software component referred to as System Data Mover (SDM) to move data from a primary storage system to a secondary storage system. XRC also requires a very accurate clock, referred to as a Sysplex Timer, to maintain data consistency and synchronize clocks of all member systems. XRC also does not support open systems. Users that have both mainframe and open systems often wish to use the same data replication technology for both.

For asynchronous data replication environments such as IBM's Global Mirror that use a journal volume to maintain consistency, it is often desirable for the journal volume to be thin-provisioned. This is because a journal volume only stores changes for a current consistency group. Depending on the workload and the recovery point objective (RPO), a journal volume often only utilizes ten to twenty percent of the size of a corresponding production volume. Once a consistency group is formed, the storage space in the journal volume may be completely freed and then used to store the next consistency group. The problem is that, in asynchronous data replication environments such as Global Mirror, consistency groups may be formed every three to five seconds and freeing storage space can be an expensive operation. Also if space is freed and then immediately reallocated for the next consistency group, this churn can seriously impact performance.

Today, algorithms that free storage space in journal volumes do not free space every consistency group, but instead use mechanisms such as time and space utilization to determine when to free storage space. Still, these algorithms do not avoid reallocation churn and can lead to storage space shortages and negative performance impacts.

In view of the foregoing, what are needed are systems and method to more efficiently and intelligently manage storage space in journal volumes. Ideally, such systems and methods will eliminate or reduce churn associated with frequently releasing and reallocating storage space.

SUMMARY

The invention has been developed in response to the present state of the art and, in particular, in response to the problems and needs in the art that have not yet been fully solved by currently available systems and methods. Accordingly, the invention has been developed to provide systems and methods for more intelligently managing storage space in journal volumes. The features and advantages of the invention will become more fully apparent from the following description and appended claims, or may be learned by practice of the invention as set forth hereinafter.

Consistent with the foregoing, a method for more intelligently managing storage space in journal volumes is disclosed herein. In one embodiment, such a method includes maintaining, on a primary storage system, a change recording data structure that documents updated storage elements of a primary volume on the primary storage system. The method further determines in which extents of the primary volume the updated storage elements reside. These extents are recorded in an extent-based data structure. The method transmits the extent-based data structure from the primary storage system to a secondary storage system that is in an asynchronous mirroring relationship with the primary storage system. The extent-based data structure is then read at the secondary storage system. The method frees, from a journal volume on the secondary storage system, extents that are not recorded in the extent-based data structure.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
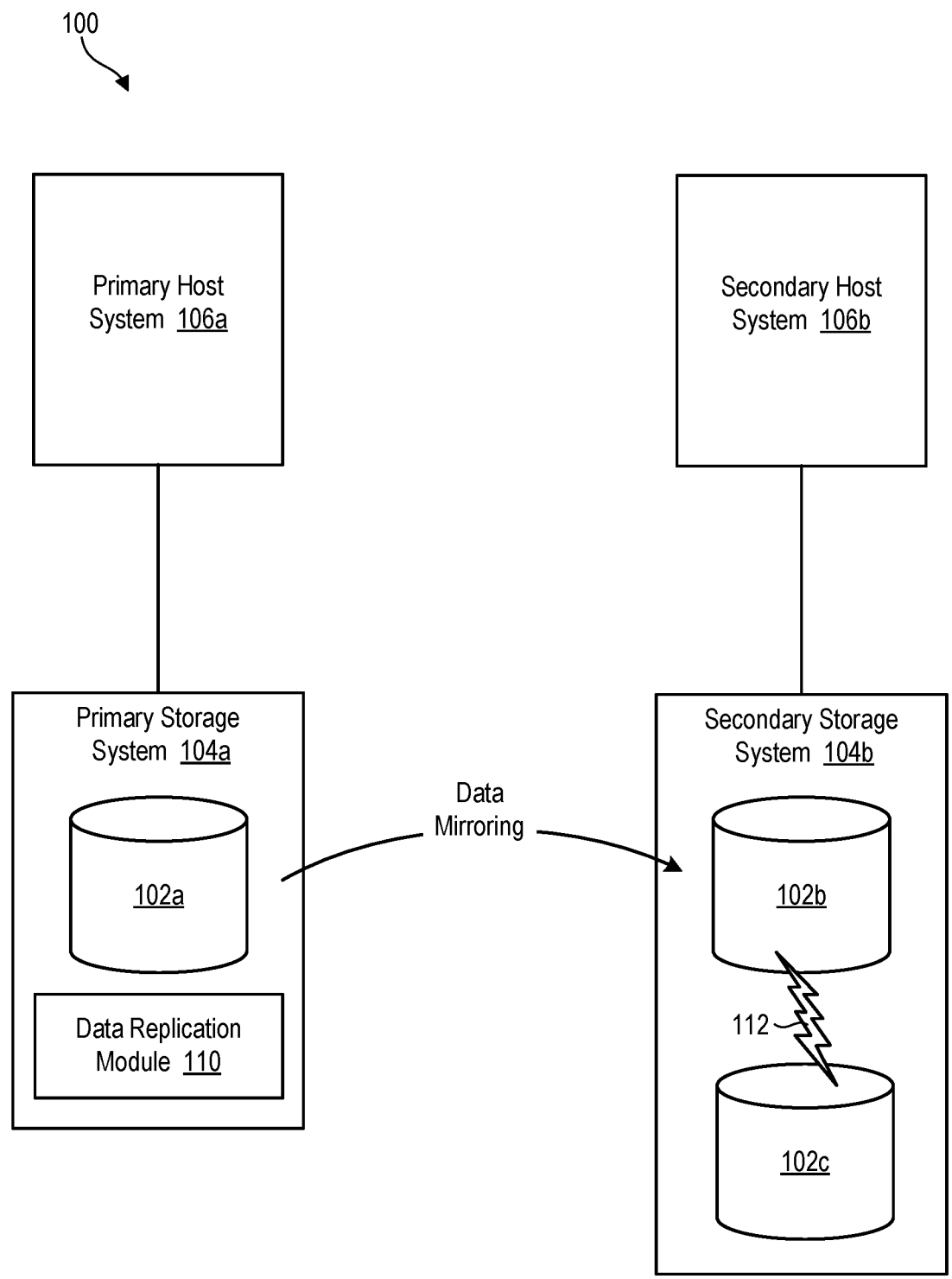
FIG. 1 is high-level block diagram showing one embodiment of an asynchronous data replication environment.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, as previously mentioned, in asynchronous data replication environments 100 such as z/OS Global Mirror (also referred to as hereinafter as "XRC") and Global Mirror, data is mirrored from a primary storage system 104a to a secondary storage system 104b to maintain two consistent copies of the data. The primary and secondary storage systems 104a, 104b may be located at different sites, perhaps hundreds or even thousands of miles away from one another. In the event an outage occurs at the primary site, I/O from host systems 106 may be redirected to the secondary storage system 104b, thereby enabling continuous operations. When the outage is corrected or repaired at the primary site, I/O from the host systems 106 may be redirected back to the primary storage system 104a.

Global Mirror is a newer technology than XRC and differs in some important ways from XRC. For example, Global Mirror runs entirely within an enterprise storage system 104, such as the IBM DS8000™ enterprise storage system, and uses Global Copy®, FlashCopy®, and a data freeze technique to maintain data consistency. XRC, by contrast, uses a host software component called System Data Mover (SDM) to move data from a primary storage system 104a to a secondary storage system 104b. XRC requires a very accurate clock (i.e., a Sysplex Timer) to maintain data consistency and synchronize clocks of all member systems.

FIG. 1 shows one embodiment of a Global Mirror data replication environment 100. As shown, functionality (referred to herein as a data replication module 110) within the primary storage system 104a may be used to directly mirror data from a primary volume 102a, in the primary storage system 104a, to a secondary volume 102b, in the secondary storage system 104b. At the secondary storage system 104b, a point-in-time copy feature 112 such as FlashCopy may be used to periodically take snapshots of data in the secondary volume 102b each time a consistency group is formed in the secondary volume 102b. These snapshots may be stored in the tertiary volume 102c (also called a journal volume 102c).

For asynchronous data replication environments such as IBM's Global Mirror that use a journal volume 102c to maintain consistency, it is often desirable for the journal volume 102c to be thin-provisioned. This is because a journal volume 102c may only store changes for a current consistency group. Depending on the workload and the recovery point objective (RPO), a journal volume 102c often only utilizes ten to twenty percent of the size of a corresponding fully allocated production volume (i.e., the primary volume 102a or secondary volume 102b). Once a consistency group is formed, the storage space in the journal volume 102c may be completely freed and then used to store the next consistency group. The problem is that, in asynchronous data replication environments 100 such as Global Mirror, consistency groups may be formed every three to five seconds and freeing storage space may be an expensive operation. Also if space is freed and then immediately reallocated for the next consistency group, this reallocation "churn" may seriously impact performance. Today, algorithms that free storage space in journal volumes 102c do not free space every consistency group, but instead use mechanisms such as time and space utilization to determine when to free storage space. Still, these algorithms do not avoid reallocation churn and can cause performance impacts and storage space shortages in the journal volume 102c.

Figure 2:
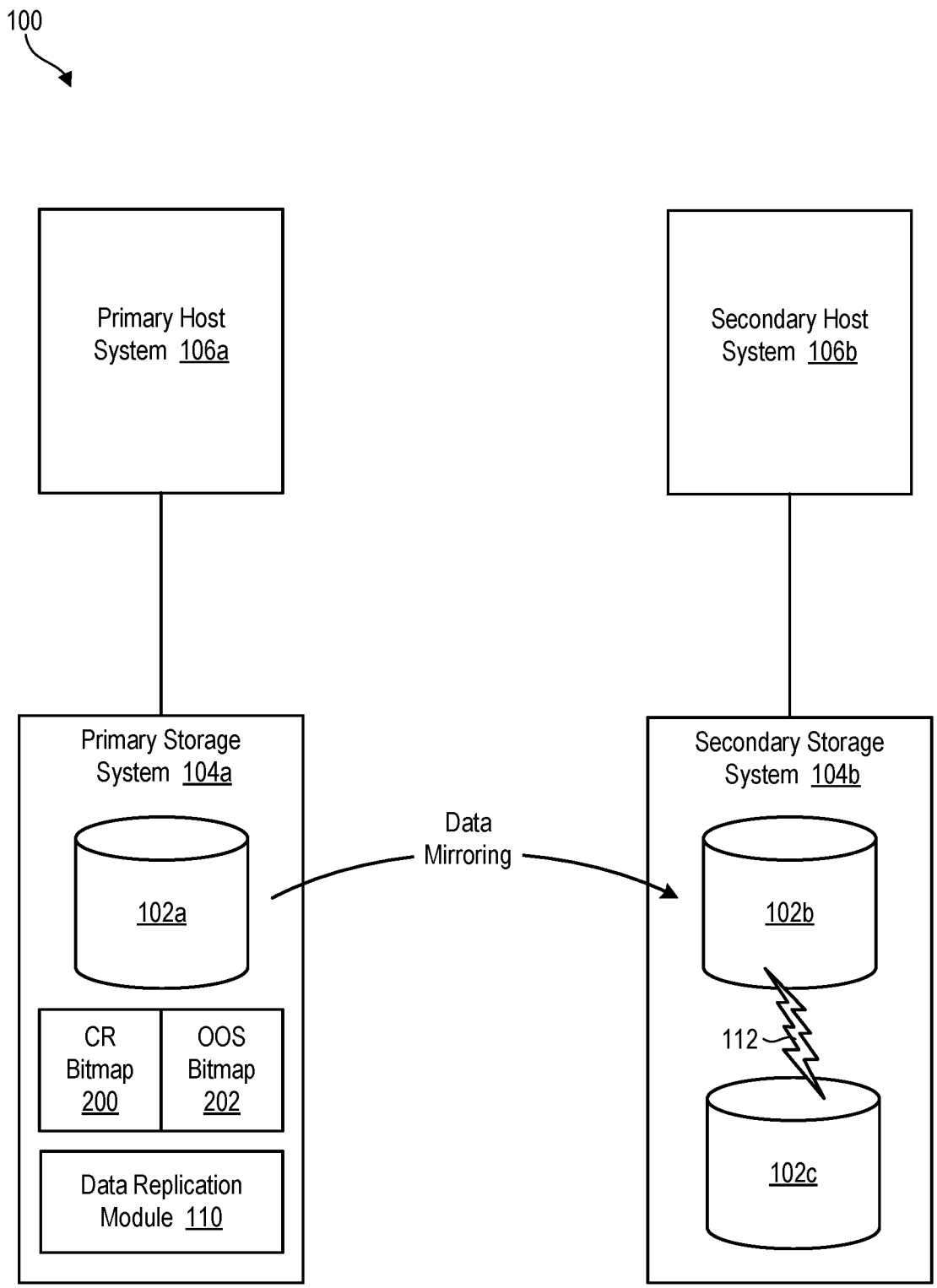
FIG. 2 is high-level block diagram showing various data structures that may be used to mirror data from the primary storage system to the secondary storage system.

Referring to FIG. 2, in order to replicate data from the primary storage system 104a to the secondary storage system 104b, various data structures may be utilized on the primary storage system 104a. For example, the primary storage system 104a may utilize a change recording bitmap 200 and an out-of-sync bitmap 202 to create consistency groups on the primary storage system 104a, as well as copy data associated with the consistency groups from the primary storage system 104a to the secondary storage system 104b.

In general, after a consistency group is formed on the primary storage system 104a, a change recording bitmap 200 may be created and initialized on the primary storage system 104a to track changes to the primary volume 102a after formation of the consistency group. The change recording bitmap 200 may identify storage elements (e.g., tracks) on the primary volume 102a that contain data that was updated since the last consistency group. When the next consistency group is formed (consistency groups may be formed every three to five seconds), the change recording bitmap 200 may be converted to an out-of-sync bitmap 202. The updated data identified in the out-of-sync bitmap 202 may then be copied from the primary storage system 104a to the secondary storage system 104b. Once all data identified in the out-of-sync bitmap 202 is copied, the consistency group may be formed on the secondary storage system 104b. A snapshot of this consistency group may then be generated and stored in the tertiary volume 102c, or journal volume 102c.

As mentioned above, when a consistency group is formed on the secondary volume 102b, all extents in the journal volume 102c may be released to a free storage pool. Storage space may then be allocated to the journal volume 102c to store data that preserves the consistency group. In general, whenever data is updated on the secondary volume 102b, the unchanged version of the data may first be copied to the journal volume 102c in order to preserve the consistency group. When data associated with a particular storage element (e.g., track) is copied to the journal volume 102c, the extent (i.e., a block of storage space of a designated size) associated with the storage element may be allocated to the journal volume 102c, if not already allocated. This extent may be allocated to the journal volume 102c even if it was just released from the journal volume 102c upon formation of the consistency group, thereby contributing to the "churn" described above.

Figure 3:
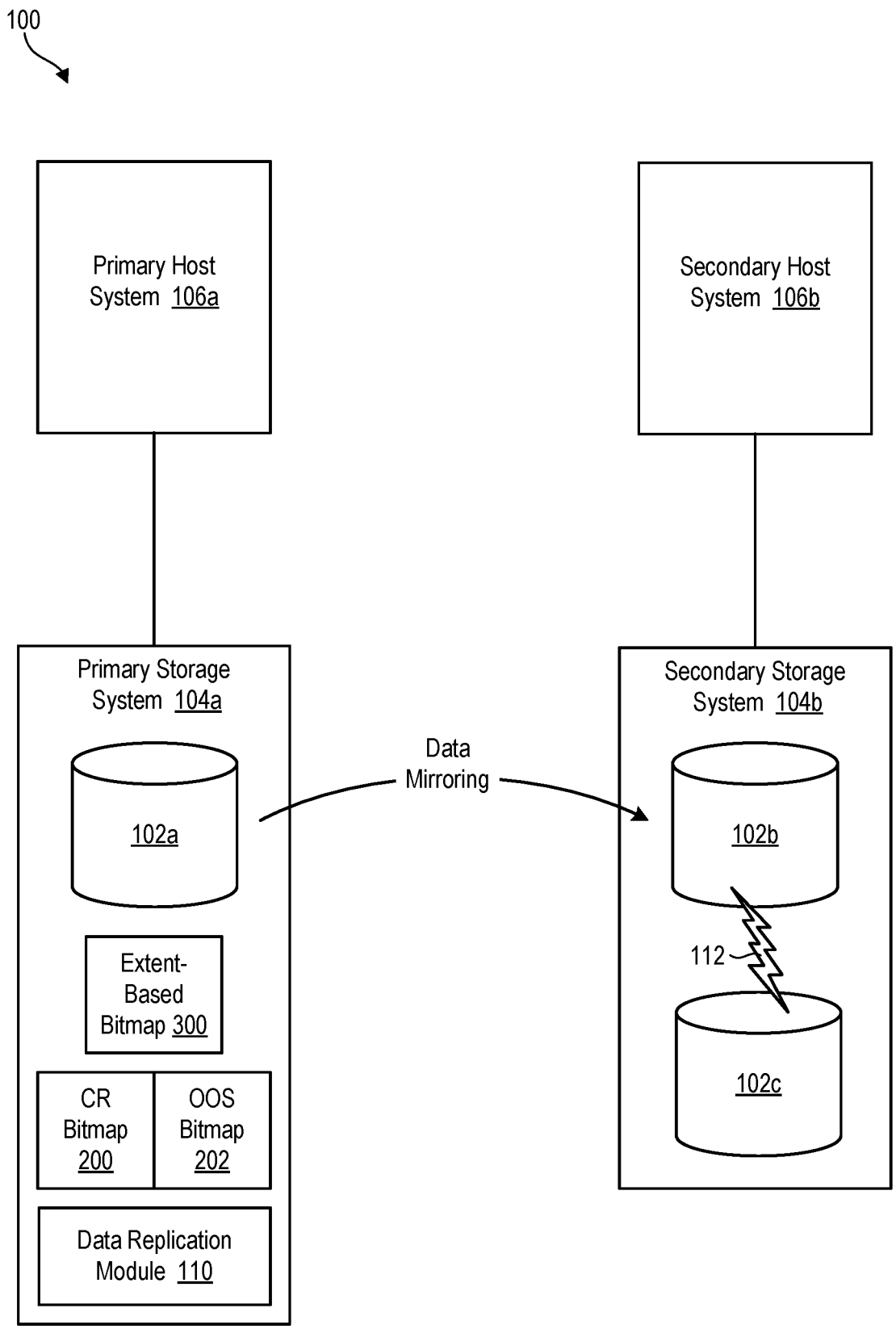
FIG. 3 is a high-level block diagram showing a new extent-based data structure to track extents that contain updated storage elements.

Referring to FIG. 3, in order to reduce or eliminate the "churn" described above, wherein extents are repeatedly released and reallocated, a new extent-based bitmap 300 may be created and maintained on the primary storage system 104a. This extent-based bitmap 300 may keep track of which extents of the primary volume 102a have received updated data since formation of the last consistency group. In certain embodiments, the extent-based bitmap 300 may, like the change recording bitmap 200, be created and initialized when a consistency group is formed on the primary volume 102a. In certain embodiments, the extent-based bitmap 300 may include a bit for each extent in the primary volume 102a. The extent-based bitmap 300 may, in certain embodiments, be populated by analyzing the change recording bitmap 200. More specifically, a bit in the extent-based bitmap 300 associated with an extent may be set when a storage element in the extent is found to contain updated data. This may be determined by analyzing the change recording bitmap 200. In certain embodiments, the extent-based bitmap 300 reflects the extent size used by the journal volume 102c.

Figure 4:
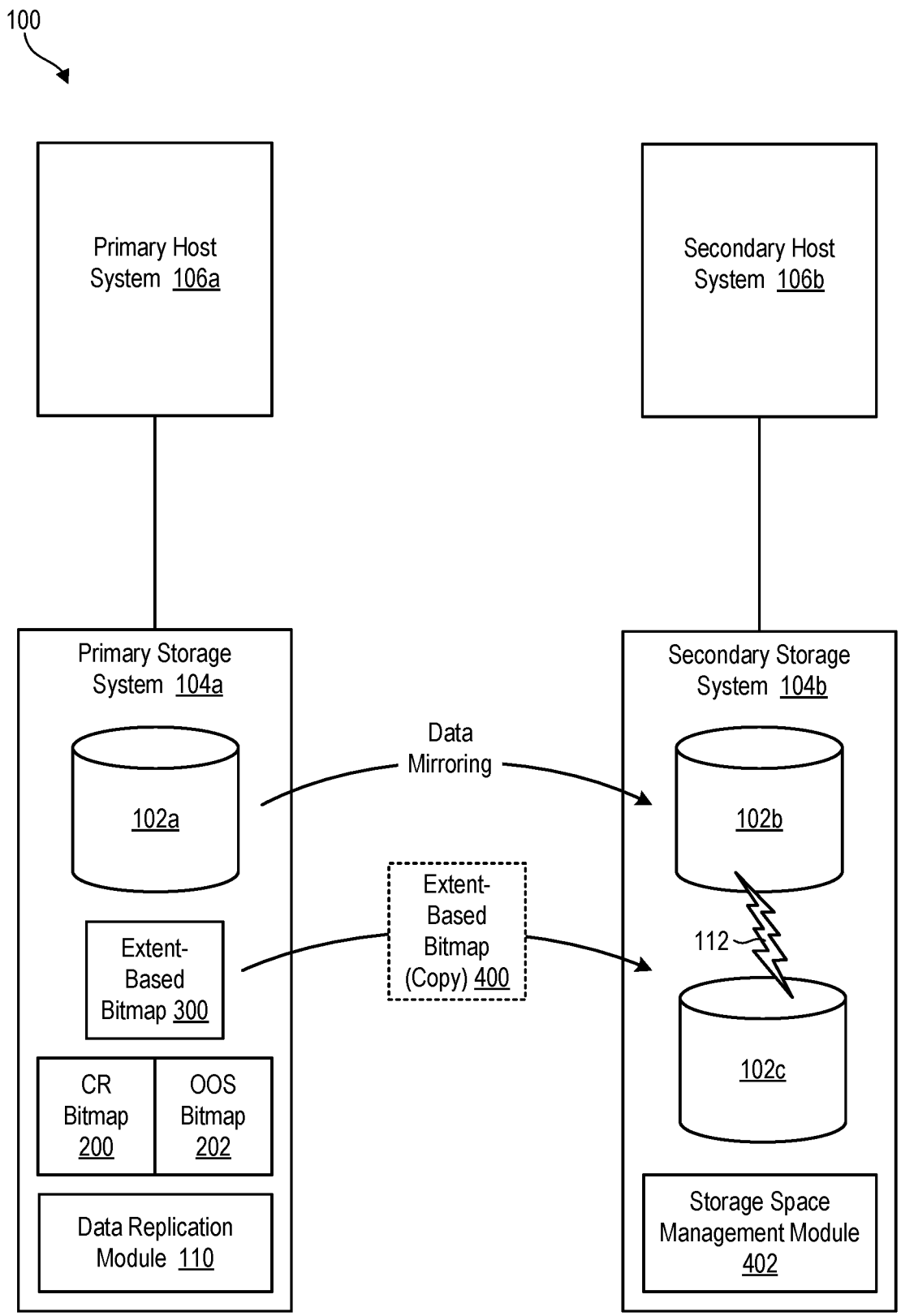
FIG. 4 is a high-level block diagram showing copying of the extent-based data structure from the primary storage system to the secondary storage system.

When the change recording bitmap 200 is converted to an out-of-sync bitmap 202, the old out-of-sync bitmap 202 may be discarded and a new change recording bitmap 200 may be created. Data indicated in the out-of-sync bitmap 202 may then be copied from the primary storage system 104a to the secondary storage system 104b, thereby forming a consistency group on the secondary storage system 104b. The primary storage system 104a may then send a command (e.g., a FlashCopy command) to the secondary storage system 104b to harden the data in the secondary volume 102b. This may be accomplished by taking a snapshot or point-in-time-copy of data in the secondary volume 102b and storing it in the tertiary volume 102c. In certain embodiments, at the time of sending the command, the primary storage system 104a may provide a copy 400 of the extent-based bitmap 300 to the secondary storage system 104b, as shown in FIG. 4.

Upon receiving the command and associated extent-based bitmap 300, a storage space management module 402 within the secondary storage system 104b may read the extent-based bitmap 300. When a consistency group is formed on the secondary volume 102b, the storage space management module 402 may free, from the journal volume 102c, any extents that are not indicated in the extent-based bitmap 300. Extents that are indicated or recorded in the extent-based bitmap 300 and are already in the journal volume 102c may be retained within the journal volume 102c instead of released. When the consistency group in the secondary volume 102b is hardened by taking a point-in-time-copy of data in the secondary volume 102b and storing it in the journal volume 102c, many extents needed to store the point-in-time-copy will ideally already be allocated to the journal volume 102c. This will ideally eliminate or reduce the reallocation "churn" described above.

Figure 5:
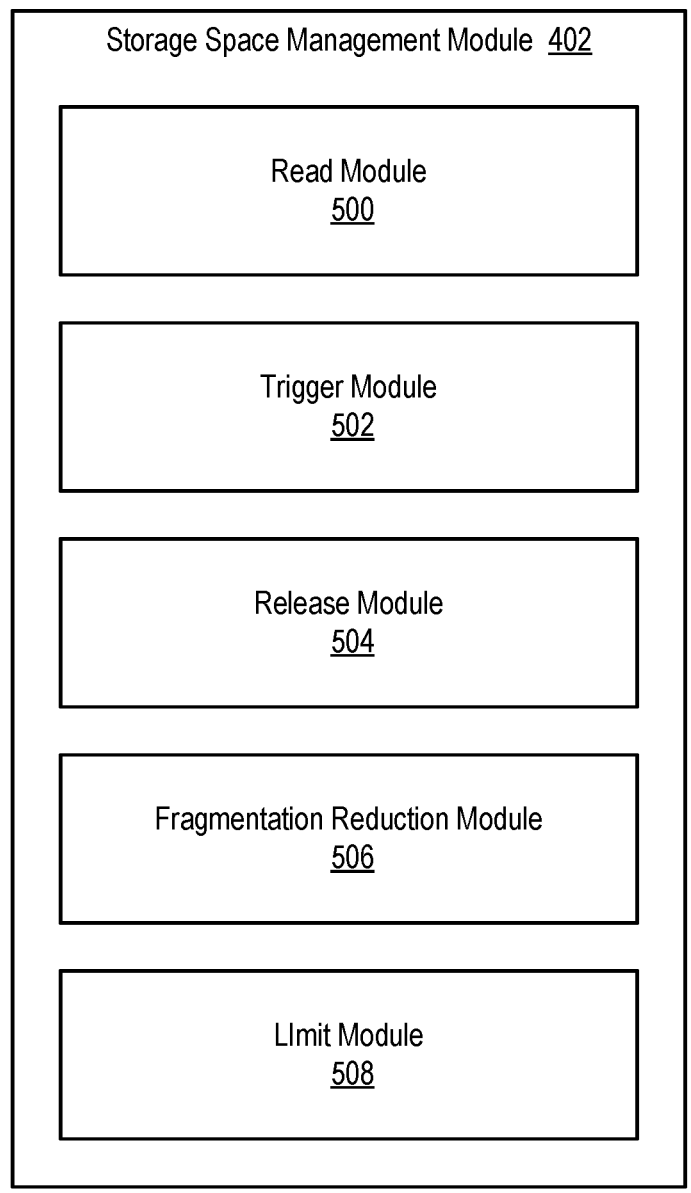
FIG. 5 is a high-level block diagram showing a storage space management module in accordance with the invention.

Referring to FIG. 5, a high-level block diagram showing a storage space management module 402 and associated sub-modules is illustrated. The storage space management module 402 and associated sub-modules may be implemented in hardware, software, firmware, or combinations thereof. The storage space management module 402 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules. As shown, the storage space management module 402 may include one or more of a read module 500, trigger module 502, release module 504, fragmentation reduction module 506, and limit module 508.

When the primary storage system 104a sends the extent-based bitmap 300 to the secondary storage system 104b, the read module 500 may read the extent-based bitmap 300 to determine which extents are to be retained in the journal volume 102c and which extents are to be freed. A trigger module 502 may trigger the release of extents from the journal volume 102c. In certain embodiments, the trigger module 502 may trigger the release of extents each time a consistency group is formed on the secondary storage system 104b. Alternatively, the trigger module 502 may implement a pacing algorithm that periodically triggers the release of extents from the journal volume 102c at times other than just the formation of a consistency group. In yet other embodiments, the trigger module 502 triggers the release of extents every nth consistency group, where n is an integer greater than one. Other times or methods for triggering the release of extents are possible and within the scope of the invention.

When the trigger module 502 triggers the release of extents, the release module 504 may release extents from the journal volume 102c in accordance with the extent-based bitmap 300. As previously mentioned, in certain embodiments, the release module 504 may release extents not recorded or indicated in the extent-based bitmap 300. Stated otherwise, the release module 504 may release extents whose associated bits are not set in the extent-based bitmap 300.

When releasing extents, the fragmentation reduction module 506 may attempt to reduce fragmentation of extents in the journal volume 102c. For example, instead of releasing every extent that is not recorded in the extent-based bitmap 300, the fragmentation reduction module 506 may look for contiguous ranges of extents that need to be released. This may be accomplished, for example, by looking for large ranges of zeros in the extent-based bitmap 300. Single and/or small sets of contiguous extents may not be released to reduce fragmentation. Thus, in certain embodiments, not all unneeded extents may be released from the journal volume 102c. Rather, the fragmentation reduction module 506 may perform more intelligent release of extents to not overly fragment the journal volume 102c.

In certain embodiments, the limit module 508 may limit the number of extents that are released from the journal volume 102c. For example, if extents are released each time a consistency group is formed on the secondary volume 102b, the limit module 508 may limit the release of extents from the journal volume 102c to a selected number. This may minimize or reduce negative performance impacts when releasing extents from the journal volume 102c. In this way, space will be released from the journal volume 102c but in a more measured way.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for more intelligently managing storage space in journal volumes, the method comprising:
   maintaining, on a primary storage system, a change recording data structure that documents updated storage elements of a primary volume on the primary storage system;
   determining in which extents the updated storage elements reside, wherein the extents are larger in size than the updated storage elements;
   recording the extents in an extent-based data structure that is maintained on the primary storage system in addition to the change recording data structure;
   transmitting the extent-based data structure from the primary storage system to a secondary storage system in an asynchronous mirroring relationship with the primary storage system;
   reading, at the secondary storage system, the extent-based data structure; and
   freeing, from a journal volume on the secondary storage system, extents that are not recorded in the extent-based data structure.

2. The method of claim 1, wherein the change recording data structure is a bitmap.

3. The method of claim 1, wherein the extent-based data structure is a bitmap.

4. The method of claim 3, wherein the bitmap includes a bit for each extent of the primary volume.

5. The method of claim 4, wherein recording the extents in the extent-based data structure comprises setting corresponding bits in the bitmap.

6. The method of claim 1, wherein transmitting the extent-based data structure from the primary storage system to the secondary storage system comprises transmitting the extent-based data structure with each consistency group.

7. The method of claim 1, further comprising copying, from the primary storage system to the secondary storage system, data in the updated storage elements.

8. A computer program product for more intelligently managing storage space in journal volumes, the computer program product comprising a non-transitory computer-readable storage medium having computer-usable program code embodied therein, the computer-usable program code configured to perform the following when executed by at least one processor:
- maintain, on a primary storage system, a change recording data structure that documents updated storage elements of a primary volume on the primary storage system;
- determine in which extents the updated storage elements reside, wherein the extents are larger in size than the updated storage elements;
- record the extents in an extent-based data structure that is maintained on the primary storage system in addition to the change recording data structure;
- transmit the extent-based data structure from the primary storage system to a secondary storage system in an asynchronous mirroring relationship with the primary storage system;
- read, at the secondary storage system, the extent-based data structure; and
- free, from a journal volume on the secondary storage system, extents that are not recorded in the extent-based data structure.

9. The computer program product of claim 8, wherein the change recording data structure is a bitmap.

10. The computer program product of claim 8, wherein the extent-based data structure is a bitmap.

11. The computer program product of claim 10, wherein the bitmap includes a bit for each extent of the primary volume.

12. The computer program product of claim 11, wherein recording the extents in the extent-based data structure comprises setting corresponding bits in the bitmap.

13. The computer program product of claim 8, wherein transmitting the extent-based data structure from the primary storage system to the secondary storage system comprises transmitting the extent-based data structure with each consistency group.

14. The computer program product of claim 8, wherein the computer-usable program code is further configured to copy, from the primary storage system to the secondary storage system, data in the updated storage elements.

15. A system for more intelligently managing storage space in journal volumes, the system comprising:
- at least one processor;
- at least one memory device operably coupled to the at least one processor and storing instructions for execution on the at least one processor, the instructions causing the at least one processor to:
  - maintain, on a primary storage system, a change recording data structure that documents updated storage elements of a primary volume on the primary storage system;
  - determine in which extents the updated storage elements reside, wherein the extents are larger in size than the updated storage elements;
  - record the extents in an extent-based data structure that is maintained on the primary storage system in addition to the change recording data structure;
  - transmit the extent-based data structure from the primary storage system to a secondary storage system in an asynchronous mirroring relationship with the primary storage system;
  - read, at the secondary storage system, the extent-based data structure; and
  - free, from a journal volume on the secondary storage system, extents that are not recorded in the extent-based data structure.

16. The system of claim 15, wherein the change recording data structure is a bitmap.

17. The system of claim 15, wherein the extent-based data structure is a bitmap.

18. The system of claim 17, wherein the bitmap includes a bit for each extent of the primary volume.

19. The system of claim 18, wherein recording the extents in the extent-based data structure comprises setting corresponding bits in the bitmap.

20. The system of claim 15, wherein transmitting the extent-based data structure from the primary storage system to the secondary storage system comprises transmitting the extent-based data structure with each consistency group.

* * * * *